April 8, 1930.  W. A. LOTH  1,753,574
AERODROME
Filed Aug. 27, 1926  3 Sheets-Sheet 1

Inventor:
W. A. Loth

April 8, 1930. W. A. LOTH 1,753,574
AERODROME
Filed Aug. 27, 1926   3 Sheets-Sheet 3

Inventor:
W. A. Loth

Patented Apr. 8, 1930

1,753,574

UNITED STATES PATENT OFFICE

WILLIAM ARTHUR LOTH, OF PARIS, FRANCE, ASSIGNOR TO SOCIETE INDUSTRIELLE DES PROCÉDÉS W. A. LOTH, OF PARIS, FRANCE, A COMPANY OF FRANCE

AERODROME

Application filed August 27, 1926, Serial No. 132,002, and in France September 19, 1925.

My invention relates to aerodromes having the shape of a circle, or of a regular geometrical surface inscribed within a circle, and in which the guiding of aircrafts is effected by electromagnetic means which acquaint the pilots of the direction to be chosen for landing, and, generally speaking, with all necessary information for executing a proper landing.

This invention has for main object to provide such an aerodrome without any superstructure liable to hinder the landing of aircrafts. With this object in view, the invention consists in arranging the shelters and the guide cables into the ground, and, more especially, in establishing circular underground galleries, which serve both to receive the known circular guide cables, and to accede to underground shelters which open in the said galleries.

The drawing represents merely as an example a form of aerodrome according to the invention.

The means forming the subject-matter of this invention will be described hereinafter as applied to a circular aerodrome, but it is obvious that these means can be used for providing an aerodrome presenting a different geometrical shape.

Figure 3:
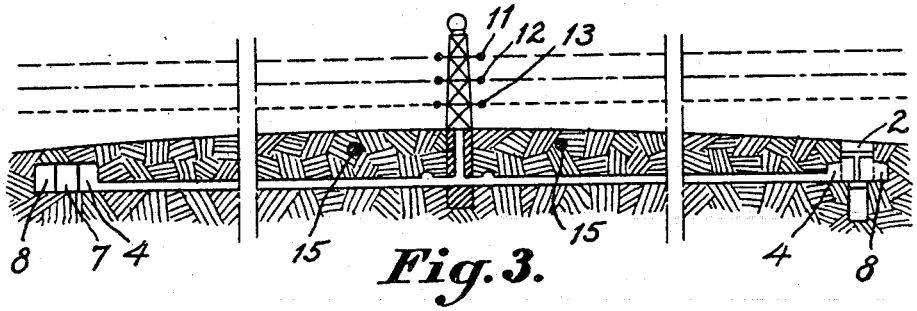
Figs. 3 and 4 are modifications illustrating the vertical section of a curved ground and of a plane ground respectively with the luminous magnetic and electromagnetic sheets giving, under all conditions of weather, to the aircraft which lands or flies off the height above the ground of the special aerodrome.
Figure 4:
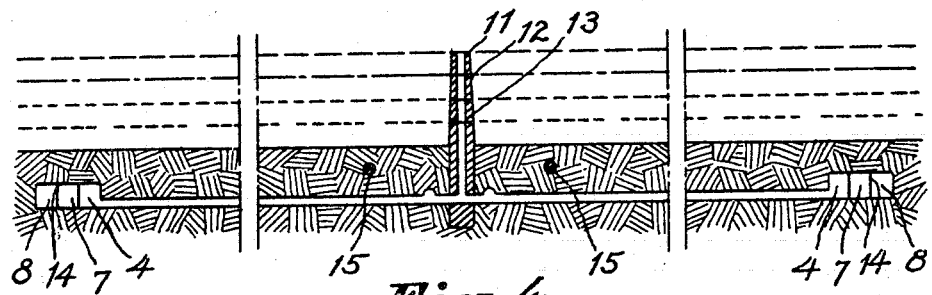

The ground of the aerodrome itself can have the shape of a cap or can be plane the two forms being illustrated in Figs. 3 and 4 respectively.

Figure 1:
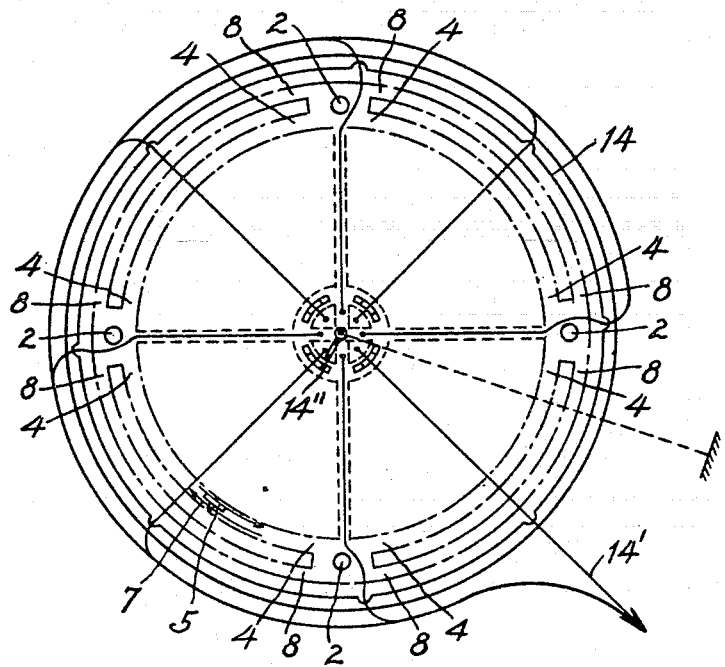
Fig. 1 is a horizontal section of a circular aerodrome constructed in accordance with the present invention.
Figure 2:
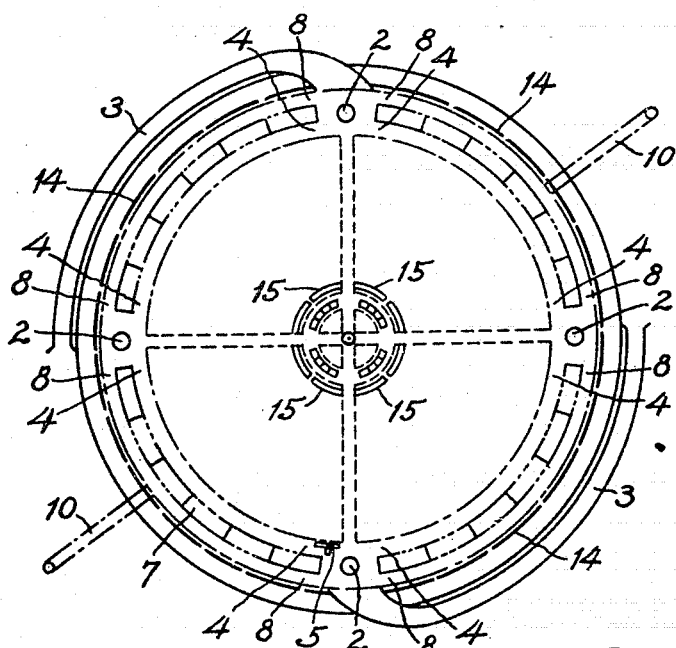
Fig. 2 is a corresponding view of a modification of installation with underground electric or electromagnetic landing cables.

The aircrafts (airplanes, helicopters, etc.) are lowered and raised from underground, either by an elevator 2 or by an inclined pathway 3. The elevators and inclines can be numerous. In Figs. 1 and 2 is illustrated a safety aerodrome comprising four elevators or lifts, Fig. 2 showing also the inclined pathways.

These elevators or lifts permit of lowering aircraft into galleries 4 which can be circular for instance. The aircraft 5 can thus be displaced on a carriage, running on rails or not, and can enter one of the cells 7.

The underground cells are formed in the ground at a depth protecting them, (as well as the airplanes they contain) from explosive bombs which might be thrown on the aerodrome.

These cells can be circularly arranged for instance. They can be constructed of materials specially adapted for underground constructions. They can be made, as well as the passages or galleries and the greater part of the substructure, of metal, cement, reinforced cement, concrete, or other suitable material.

Figure 5:
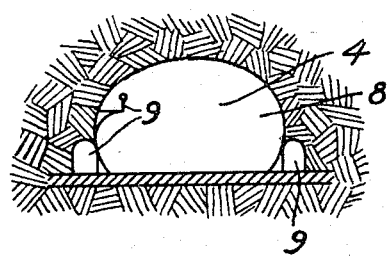
Figs. 5 and 6 illustrate, on an enlarged scale, a section of the inner dug outs forming passages.
Figure 6:
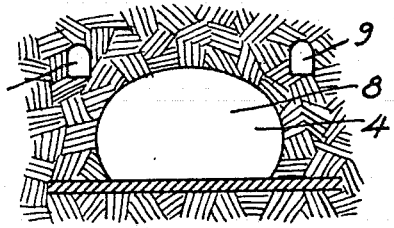

This arrangement permits of the provision about the cells according to a circle of greater diameter, a second gallery 8 which can be also circular. A series of airplane cells is thus obtained between two galleries which can serve: one for the entrance, the other for the exit, so as to facilitate handling of the aircraft. Passages or galleries 9 for service purposes are provided either at (Fig. 5), or above (Fig. 6) the level of the galleries 4 and 8. It is obvious that several stories or tiers of galleries of cells can be provided.

The underground cells are used not only as sheltering places for airplanes, but some of them may obviously be utilized as dormitories, rooms for pilots, and other purposes, other cells are specially arranged and reserved for passengers, if a commercial aerodrome is to be established. For military aerodromes the cells are arranged for the various services necessary for the maintenance of the aircraft.

Along the cells extends a ventilation conduit. This ventilation conduit is adapted on the one hand to renew the foul air of the underground rooms and, on the other hand, to receive fresh air at different points 10, at a certain distance from the aerodrome. This conduit serves, moreover, to drive back the air from the underground construction of the aerodrome, through all the points communicating with the atmosphere.

This arrangement is adapted to drive gases out of the underground shelters, in case of an attack on the aerodrome by hostile aircraft throwing gas bombs. A water conduit-pipe 40 of large outflow is also provided and extends along the cells with supplementary jets and water supply taps in order to eventually and rapidly master a local fire. A pipe 41 supplying an inert gas, or any other fire extinguishing medium, is also provided along the cells and passages. The passages can have the same width or have variable widths. Their width can, for instance, decrease as they extend from the points where the elevators or lifts are arranged.

Figure 11:
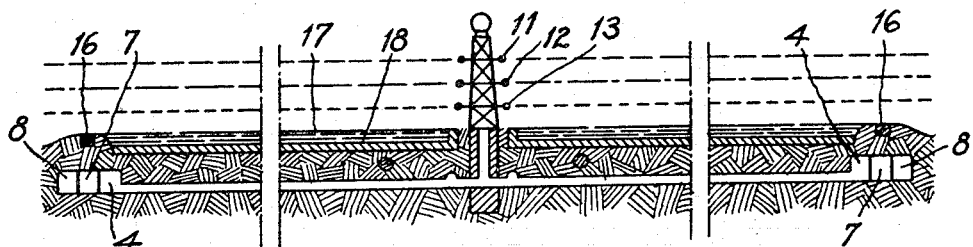
Fig. 11 shows an arrangement whereby the landing ground can be transformed for use in connection with a water plane.

Passages are provided for connecting the center of the aerodrome with the cells which have received the aircraft. At the center is arranged the works supplying to the various apparatus the necessary energy, or distributing to these apparatus the necessary energy, received from a distant point by underground cables. These works are first adapted to operate the various signal apparatus which can be arranged for instance in a tower, made of any suitable material, arranged at the center of the ground. In this tower can be placed the various observation apparatus and particularly the apparatus indicating to the pilot, by flat superposed light beams 11, different heights above the ground (Figs. 3, 4 and 11). These circular beams can be coloured or otherwise distinguishable from one another. In this tower are arranged the apparatus provided with horizontal frames indicating to the pilot, by magnetic sheets 12, or electromagnetic sheets 13, the different heights above the aerodrome in foggy weather. A light can be placed at the top of the tower. The various sheets can be created in the landing direction only. The ground being thus completely cleared, it becomes invulnerable.

Devices for firing upon airplanes can be provided. Besides, the complete clearing of the ground facilitates the landing and flying off manœuvres of the pilots. For each aerodrome whatever may be the direction of the wind, the pilots will have the same manœuvres to make for all the landings. In fact, the entirely cleared ground being circular, all the directions, according to the different radii, are the same. If use is made of guide lines, the circular aerodrome is surrounded by a deeply buried cable 14. The guide line 14' (Fig. 1) can form a rosace the branches of which are radially arranged relatively to the center of the ground; these branches combine with contact pieces and a central switch 14'', this permitting to cause the electric current passing through the guide cable to pass in the branch which is directed parallel to the direction of the wind. Another buried cable forms about the center of the ground a circle of smaller radius 15 (Fig. 2). The currents sent in these cables have different frequencies. The pilot is warned acoustically or by visual devices, when he passes above the cable 14, having a large radius, surrounding the circular aerodrome. He must then slow down, descend and he must have landed before passing above the second cable 15 which constitutes the danger warning.

Figure 7:
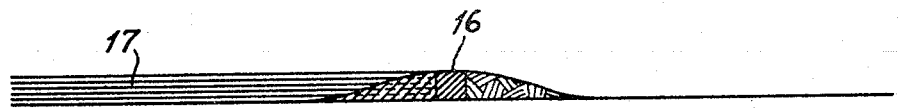
Figs. 7, 8 and 9 show modes of illuminating the landing ground by horizontal light beams.
Figure 8:
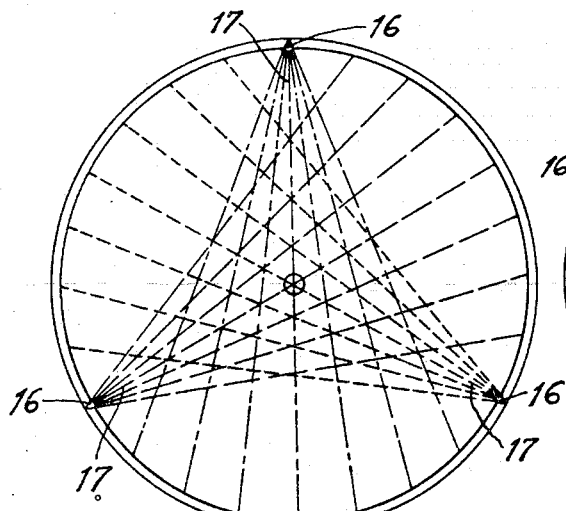
Figure 9:
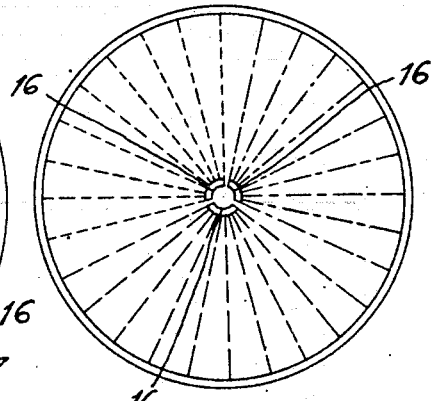

Finally in addition to the luminous, magnetic and electromagnetic means, created by the sources of light, magnetic fields and electromagnetic waves placed in the tower situated at the center of the aerodrome and serving to give to the pilots their heights above the ground, the safety circular aerodrome is provided with flood lighting (Figs. 7, 8 and 9). This lighting, extending quite near the ground (1 meter for instance), (Fig. 7), over all the surface of the aerodrome, can be obtained in any manner whatever. The light can be obtained, either by an infinity of sources distributed about the aerodrome, or, for instance, by three sources of light 16 (Fig. 8) provided with prisms permitting the projection of horizontal parallel beams, horizontally diverging in a fan-like manner (Fig. 8). It will be seen that if these three sources are placed on the periphery of the ground, the light will increase from the periphery towards the center of the safety circular underground aerodrome. The three sources of light 16 can be arranged at the center of the ground, in the tower or at the foot of the latter (Fig. 9).

The sources of light placed in the central tower can be electric lamps, arc lamps or luminescence arc lamps (neon lamps for instance).

It is obvious that the same system of buried aerodrome may be applied to lakes, artificial or not. The ground of the circular aerodrome can be replaced by a circular water basin, all the sheds being buried in the underground of the circular basin. In the same way, immersed concrete shelters, with shafts for access, can be used as shown in Fig. 11. The advantage of the water basin 18 over the aerodrome on land, is that the latter can be ploughed by bombs to such a degree as to subsequently prevent the flying off and landing of the airplanes, while the surface of water cannot be so permanently deformed.

Figure 10:
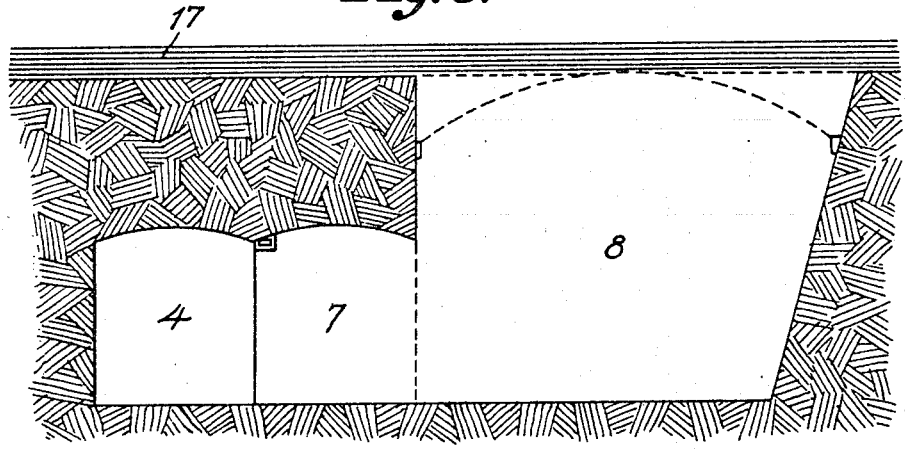
Fig. 10 is a constructional modification of the underground shelters or dug outs.

Fig. 10 shows the arrangement of a trench-like gallery 8 open at the top, covered with a railing on which the airplanes can run and which can be provided at certain points of the aerodrome for special needs. Above the aerodrome the flood lighting has been illustrated.

What I claim as my invention and desire to secure by Letters Patent is:—

1. An aerodrome of regular geometrical shape inscribed within a circle and including a peripheral underground gallery, underground shelters opening in said gallery, means of access to said gallery, and a circular electro-magnetic guide cable arranged adjacent said gallery.

2. An aerodrome having a regular geometrical shape inscribed within a circle and including a peripheral underground gallery, underground shelters opening in said gallery, means of access to said gallery, another circular gallery of smaller radius than the first mentioned gallery, radial galleries connecting the two circular electro-magnetic galleries, and a circular guide cable arranged adjacent the two circular galleries.

In testimony whereof I have signed my name to this specification.

WILLIAM ARTHUR LOTH.